(12) United States Patent
Norman

(10) Patent No.: US 9,561,560 B2
(45) Date of Patent: Feb. 7, 2017

(54) BACKSTRIKE DETECTION SYSTEM FOR LASER DRILLING THIN MATERIALS

(71) Applicant: UNITED TECHNOLOGIES CORPORATION, Farmington, CT (US)

(72) Inventor: Richard F. Norman, West Warren, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 401 days.

(21) Appl. No.: 14/132,199

(22) Filed: Dec. 18, 2013

(65) Prior Publication Data
US 2014/0301425 A1 Oct. 9, 2014

Related U.S. Application Data

(60) Provisional application No. 61/799,273, filed on Mar. 15, 2013.

(51) Int. Cl.
*B23K 26/03* (2006.01)
*B23K 26/38* (2014.01)

(52) U.S. Cl.
CPC ......... *B23K 26/034* (2013.01); *B23K 26/032* (2013.01); *B23K 26/386* (2013.01); *B23K 2201/001* (2013.01)

(58) Field of Classification Search
CPC .................................................. B23K 26/706
See application file for complete search history.

(56) References Cited

U.S. PATENT DOCUMENTS

| | | | | |
|---|---|---|---|---|
| 5,991,319 A | * | 11/1999 | Zamel | B23K 26/702 372/107 |
| 7,432,489 B2 | * | 10/2008 | Pileri | F16P 3/14 250/205 |
| 8,173,932 B2 | * | 5/2012 | Kobayashi | B23K 26/389 219/121.7 |

FOREIGN PATENT DOCUMENTS

| | | | | |
|---|---|---|---|---|
| DE | 102005054607 A1 | * | 5/2007 | ............. B23K 26/03 |
| JP | 08103879 A | * | 4/1996 | |

* cited by examiner

*Primary Examiner* — Minh Phan
*Assistant Examiner* — Leon W Rhodes, Jr.
(74) *Attorney, Agent, or Firm* — Cantor Colburn LLP

(57) ABSTRACT

In accordance with one aspect of the disclosure, a drill and detection system is disclosed. The system may include a drill and a thermal detector spaced apart from the drill. The drill may be directed in a first direction and the thermal detector may be directed in a second direction opposite the first direction.

13 Claims, 2 Drawing Sheets

BACKSTRIKE DETECTION SYSTEM FOR LASER DRILLING THIN MATERIALS

FIELD OF THE DISCLOSURE

The present disclosure generally relates to backstrike detection systems, and more specifically, relates to backstrike detection when laser drilling thin materials.

BACKGROUND OF THE DISCLOSURE

In many industries, thin materials are used for construction. Many times these materials are used in materials, or oriented very close together with other thin materials. In the aerospace industry, often times a first material, usually a hot material, requires holes for cooling purposes, while a second material, typically a cold material, does not have holes so as to ensure the structural integrity of the second material.

One such situation where this arises is in liners for hot sections of gas turbine engines, such as an augmenter liner, for example. Laser drilling allows for these holes to be created in the first material. However, once the laser drills through the first material, the second material may be inadvertently struck by the laser, called a backstrike. This may be caused by variability in controls for laser positioners, the number of laser shots used, laser output controls, and material deficits such as thickness or voids in castings. This backstrike is undesirable and may cause damage to the second material, such as creating a crack in the second material.

In some materials this strike is detectable due to a color change in the material visible on the opposite side or by visual inspection between the thin materials being drilled. However, many times the materials are impossible to inspect visually due to geometric or material constraints and do not change colors when struck. Thus, damage caused by the backstrike may be completely undetectable except by destroying the assembly, such as by cutting up the materials to examine them.

Therefore, a non-invasive method of detecting backstrikes during the process of drilling closely-spaced, thin materials is needed.

SUMMARY OF THE DISCLOSURE

In accordance with one aspect of the disclosure, a drill and detection system is disclosed. The system may include a drill and a thermal detector spaced apart from the drill. The drill may be directed in a first direction and the thermal detector may be directed in a second direction opposite the first direction.

In a refinement, the drill may be a laser drill.

In another refinement, the thermal detector may be a non-contact thermometer.

In another refinement, the thermal detector may be a thermal imaging camera.

In yet another refinement, the system may further include a processor in electronic communication with the drill and the thermal detector.

In a further refinement, the system may further include a memory device in electronic communication with the processor.

In another further refinement, the system may further include an alerting device in electronic communication with the processor.

In yet another refinement, the system may further include an actuator operatively associated with the drill and thermal detector.

In still another refinement, a pair of thin materials may be positioned between the drill and thermal detector such that the drill may be directed at one thin material and the thermal detector is directed at the other thin material.

In a further refinement, a backstrike prevention material may be positioned between the first and second thin materials.

In accordance with another aspect of the present disclosure, a method of detecting a backstrike on thin materials is disclosed. The method may include drilling a hole in a first thin material with a drill and monitoring a second thin material proximate the first thin material with a thermal detector.

In a refinement, the method may further include striking the second thin material with the drill after drilling the hole in the first thin material and subsequently detecting an increase in temperature in the second thin material with the thermal detector.

In a further refinement, the method may further include recording an image of a thermal bloom associated with the temperature increase in the second thin material with the thermal detector.

In another further refinement, the method may further include transmitting a signal from the thermal detector to a processor after detecting a change in temperature in the second thin material with the thermal detector.

In yet a further refinement, the method may further include transmitting a signal to the drill from the processor to cease operation in response to the signal from the thermal detector.

In yet another further refinement, the method may further include generating a signal with the processor and transmitting the signal to an alerting device in response to receiving a signal from the thermal detector.

In still another further refinement, the method may further include generating a signal with the processor and transmitting the signal to an actuator in response to receiving a signal from the thermal detector. The actuator may be operatively associated with the drill and the signal may instruct the actuator to move the drill.

In accordance with yet another aspect of the present disclosure, a method of detecting a backstrike on thin materials is disclosed. The method may include drilling a hole in a first thin material with a drill; monitoring a second thin material proximate the first thing material with a thermal detector; striking the second thin material with the drill after drilling the hole in the first thin material; detecting a change in temperature in the second thin material with the thermal detector; and transmitting a signal from the thermal detector to a processor when the change in temperature is equal to or greater than a preset value.

In a refinement, the method may further include generating a signal with the processor and transmitting the signal to an alerting device in response to the signal from the thermal detector.

In a further refinement, the method may further include transmitting a signal from the processor to the drill to cease operation in response to generating a preset number of alerts in response to signals received from the thermal detector.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
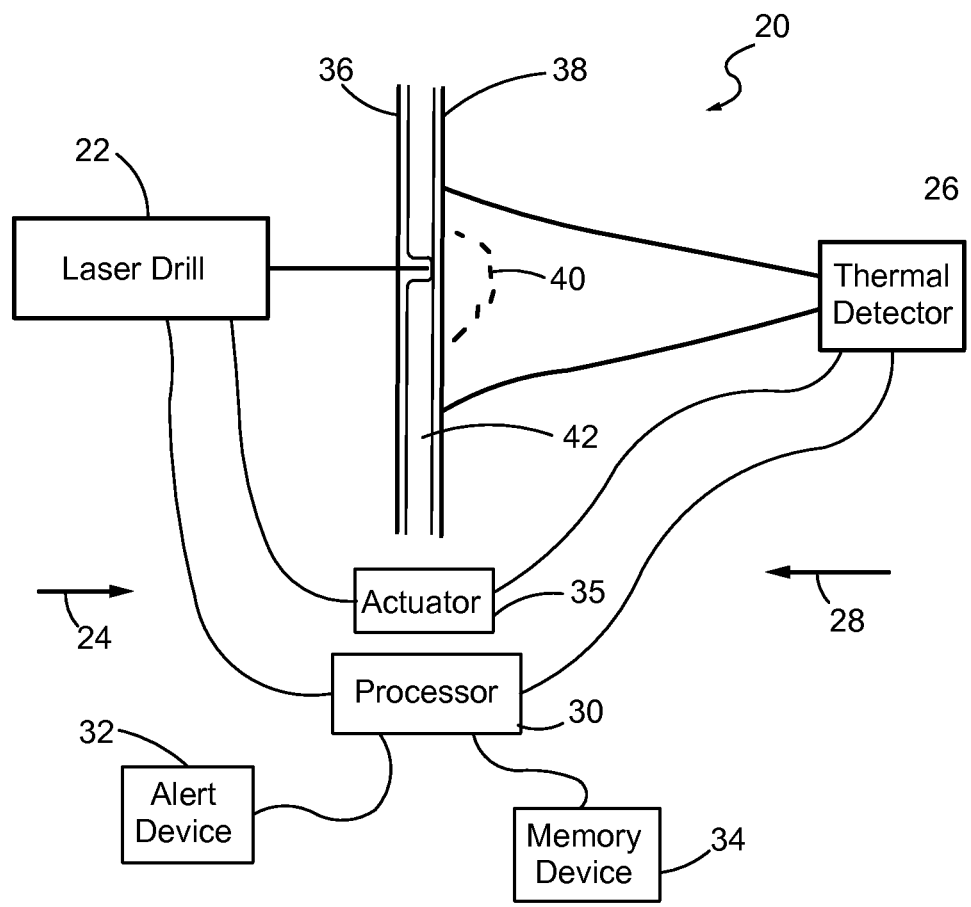
FIG. 1 is a schematic diagram of a drill and detection system constructed in accordance with an aspect of the present disclosure.

Referring now to the drawings, and with specific reference to FIG. 1, a drill and detection system is illustrated and generally indicated by reference numeral 20. The system 20 may include a laser drill 22 directed in a first direction 24 and a thermal detector 26 directed in a second direction 28, opposite the first direction 24. The thermal detector 26 may be a non-contact thermometer, a thermal imaging camera, a wandering thermal coupler, a combination of detectors, or the like. Both the laser drill 22 and the thermal detector 26 may be in electronic communication with a processor 30. The processor 30 may also be in electronic communication with an alerting device 32 such as a noise generator, a light generator, a text message generator, a combination of alerting devices, or the like. The processor 30 may also be in electronic communication with a memory device 34 and/or an actuator 35. The actuator 35 may be operatively associated with the laser drill 22 and/or the thermal detector 26.

In operation, the laser drill 22 operates on a first thin material 36 coupled to a second thin material 38. For example, the laser drill 22 may be used to drill a cooling hole in a hot layer of an exhaust liner for a gas turbine engine. The thin materials 36, 38 may be coupled together by many means such as, but not limited to, by a weld joint or by a bolt. Typically, the first material 36 needs to be operated upon, but the second material 38 cannot be operated upon without detrimental effects, such as cracking of the material 38. However, after drilling through the first material 36 the laser drill 22 may continue operating and begin drilling the second material 38. This may be caused by variability in controls for laser positioners, the number of laser shots used, laser output controls, and material deficits such as thickness or voids in castings of the thin materials 36, 38.

In order to determine if the laser drill 22 strikes the second material 38 the thermal detector 26 monitors the second material 38 directly opposite to the laser drill 22. In this position, if the laser drill 22 strikes the second material 38, referred to as a backstrike, the thermal detector 26 will detect a thermal bloom 40, or change in temperature, in the second material 38. The actuator 35 may move the thermal detector 26 with the laser drill 22 to monitor the second material 38 directly opposite the laser drill 22 at all times.

A backup laser backstrike prevention material 42 may be positioned between the thin materials 36, 38. This backstrike prevention material 42 may be used to prevent immediate damage to the second material 38 if the laser drill 22 continues operating after a hole is drilled in the first material 36. Such a material 42 may transmit heat from a laser strike to the second material 38. This increase in heat may be detected by the thermal detector 26 in the same manner as if the second material 38 had been struck directly.

The thermal detector 26 may generate and transmit a signal to the processor 30 when the thermal detector 26 detects a thermal bloom 40 caused by either a direct strike on the second material 38 or by a heat transfer from the backstrike prevention material 42. The thermal detector 26 may have a preset temperature change that the thermal detector must detect before the thermal detector 26 may generate or transmit the signal to the processor 30. This may prevent false readings due to natural fluctuations of temperature in the second material 38. Additionally, the preset temperature change may be a change in temperature that indicates that damage has been inflicted or may soon be inflicted upon the second material 38. This may prevent alerting an operator of the drill and detection system 20 unnecessarily and may allow the laser drill 22 to be stopped and adjusted before damage is inflicted upon the second material 38.

The signal generated by the thermal detector 26 may depend upon what detector is being used. For example, the thermal detector 26 may be a non-contact thermometer and the signal may simply be an electrical signal indicating that the preset change in temperature has occurred or the signal may indicate what temperature the second material 38 has reached and/or how quickly the temperature change occurred. In a further example, the thermal detector 26 may be a thermal imaging camera, the signal may be a thermal image of the heat bloom 40, a video of the change in temperature in the second material 38, an indication of the current temperature of the second material 38 at the strike, and/or a record of how quickly the temperature change occurred. Other thermal detectors 26 may generate similar signals or signals unique to the thermal detector 26 in use.

When the processor receives the signal from the thermal detector 26 indicating a backstrike, the processor 30 may generate and store a log in the memory device 34, store the signal in the memory device 34, and/or generate and transmit a signal to the alerting device 32, the laser drill 22, and/or the actuator 35. The log may include a date and/or time of the signal reception and/or backstrike, a temperature of the second material 38, a record of the speed of the temperature change, a position of the strike on the second material 38, a still image of the heat bloom 40, a video of the change in temperature in the second material 38, a record of an action taken due to the signal, and/or other information related to the temperature change transmitted from the thermal detector 26 or details monitored by the processor 30, such as the position of the backstrike on the second material 38. This log allows engineering and quality personnel to evaluate the part life of the materials 36, 38 before the materials 36, 38 are utilized or sold and keep an accurate record of any damage inflicted upon the materials 36, 38.

The processor 30 may also be configured to transmit a signal to the alerting device 32, the laser drill 22, and/or the actuator 35 whenever a signal is received from the thermal detector 26 or only after a preset number of signals have been received by the processor 30. In the case of the alerting device 32, the signal may cause the alerting device 32 to activate to attempt to alert the operator that a strike has occurred. In the case of the laser drill 22, the signal may cause the laser drill 22 to cease operation or the signal may instruct the laser drill 22 to alter its operation, such as by reducing an activation period of the laser or decreasing energy output of the laser drill 22. The signal may also be transmitted to the actuator 35 to instruct the actuator 35 to reposition, or otherwise move, the laser drill 22 with respect to the thin materials 36, 38. This may allow the processor 30 to automatically correct an error in the operation of the laser drill 22 so that an error does not occur again.

Once the first thin material 36 has been fully operated upon by the laser drill 22, the processor may generate a report detailing any strikes that occurred during the operation of the laser drill 22. This report may detail some or all of the information stored in the memory device 34. Further, the report may include a full video of the operation from the thermal detector 26, if the thermal detector is configured to record such a video, such as by incorporating a thermal imaging camera. This report may be reviewed by the operator to determine if any backstrikes have occurred and/or damaged the second material 38 during the operation of the laser drill 22. This report may also be used to assure a user of the thin materials 36, 38 that the material was properly operated upon by the laser drill 22.

While the foregoing describes the drill and detection system 20 as utilizing a laser drill 22, this is only for description purposes and any drill or cutting device that increases the temperature of the second material 38 during a backstrike is possible such as, but not limited to, a directed electron beam or a plasma cutter.

Figure 2:
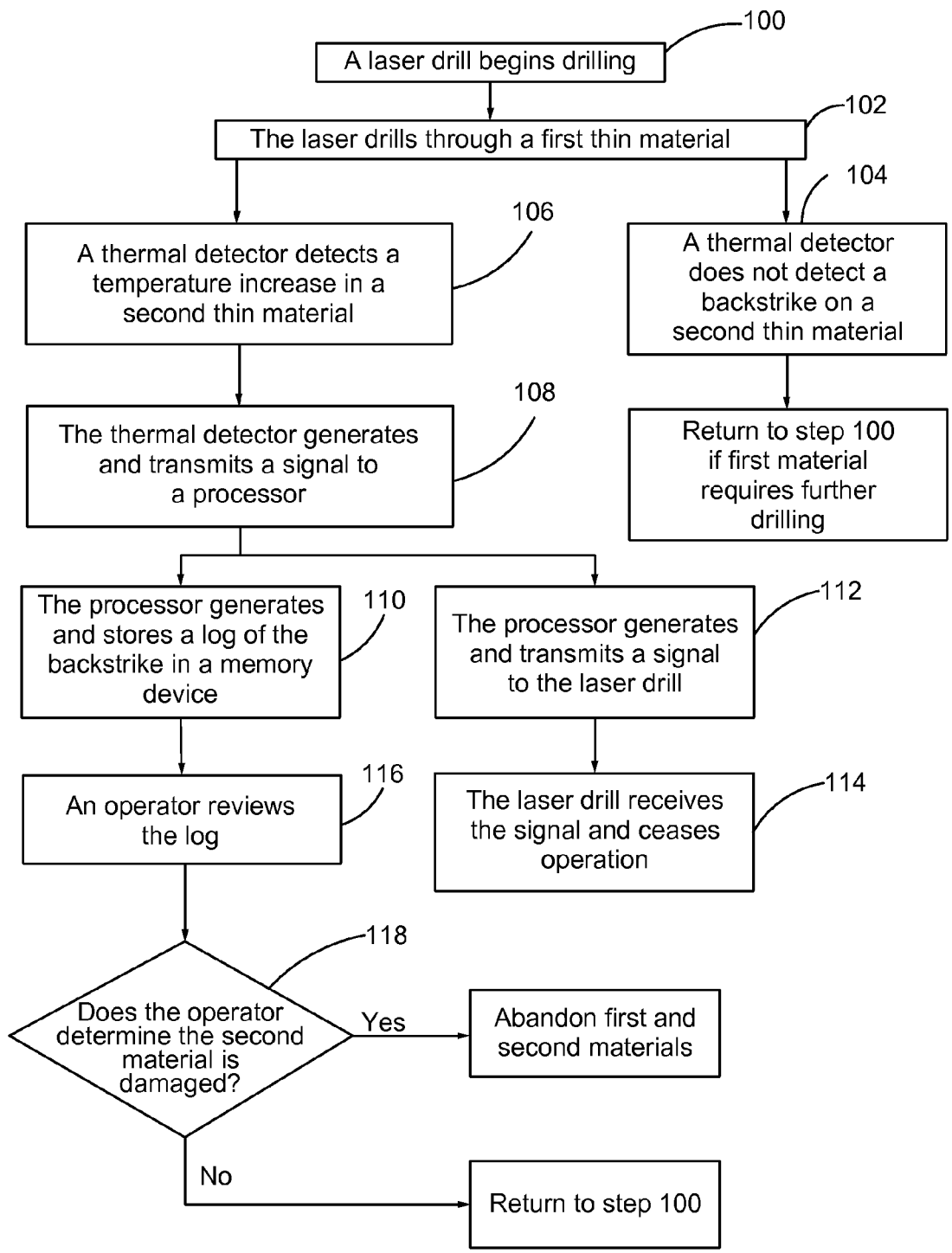
FIG. 2 is a flow chart of a method of operating a drill and detection system constructed in accordance with an aspect of the present disclosure.

A flow chart is illustrated in FIG. 2 depicting an example of operation of the drill and detection system 20. In a step 100, the laser drill 22 begins drilling the first material 36. The laser drill 22 drills through the first material 36, in a step 102. In a step 104, no back strike is detected by the thermal detector 26. The process continuously repeats from step 100 to step 104 until either a backstrike is detected by the thermal detector in a step 106 or the first material 38 is fully drilled.

At the step 106, the thermal detector 26 registers an increase in temperature in the second material 38. The thermal detector 26 generates a signal and transmits the signal to the processor 30 in a step 108. The processor 30 generates a log of the backstrike and stores the log in a memory device 34 in a step 110. In a step 112, consecutive with step 110, the processor 30 generates a signal and transmits the signal to the laser drill 22. The laser drill 22 receives the signal from the processor 30 in a step 114 and ceases operation.

In a step 116, an operator reviews the log stored in the memory device 34. In a step 118, the operator decides to continue drilling the first thin material 36 if the second material 38 is undamaged or the operator decides to abandon drilling the thin materials 36, 38 if the second material 38 is damaged.

INDUSTRIAL APPLICABILITY

From the foregoing, it can be seen that the technology disclosed herein has industrial applicability in a variety of settings such as, but not limited to monitoring and positively identifying backstrikes on thin materials by a thermal detector when a thin material is being worked by a drill or cutting device. When a backstrike is detected, the thermal detector may transmit a signal to a processor that takes action to alert an operator, move the drill, disable the drill, record the strike, or a combination of these and other actions. This detection system may allow for non invasive identification of backstrikes that may cause damage to the thin material.

While the present disclosure has been made in reference to a laser drill, and specifically to a backstrike detection system for use with a laser drill, one skilled in the art will understand that the teachings herein can be used in other applications as well such as, but not limited to, non-invasively detecting backstrikes when drilling or cutting thin materials when using a drilling or cutting device that may create a measurable change in a temperature of the thin material. It is therefore intended that the scope of the invention not be limited by the embodiments presented herein as the best mode for carrying out the invention, but that the invention include all equivalents falling within the spirit and scope of the appended claims as well.

What is claimed is:

1. A drill and detection system, comprising:
    a laser drill directed in a first direction;
    a thermal detector spaced apart from the laser drill and directed in a second direction opposite to the first direction, and wherein a material to be operated on is placeable between the thermal detector and the laser drill;
    a processor in electronic communication with the laser drill and the thermal detector; and
    an alerting device in electronic communication with the processor, wherein the processor transmits a signal to the alerting device when the thermal detector has detected that the laser drill has first contacted a surface proximate to the thermal detector, and wherein the processor alters operation of the laser drill in response to the signal.

2. The drill and detection system of claim 1, wherein the thermal detector is a non-contact thermometer.

3. The drill and detection system of claim 1, wherein the thermal detector is a thermal imaging camera.

4. The drill and detection system of claim 1, further comprising a memory device in electronic communication with the processor.

5. The drill and detection system of claim 1, further comprising an actuator operatively associated with the laser drill and the thermal detector.

6. The drill and detection system of claim 1, wherein a pair of thin materials are positioned between the laser drill and thermal detector such that the laser drill is directed at a first thin material and the thermal detector is directed at a second thin material.

7. The drill and detection system of claim 6, wherein a backstrike prevention material is positioned between the first and second thin materials.

8. A method of detecting a backstrike on thin materials, comprising:
    drilling a hole in a first thin material with a laser drill;
    monitoring a second thin material proximate the first thin material with a thermal detector;
    detecting when the laser drill first strikes the second thin material with the thermal detector;
    transmitting a first signal from the thermal detector to a processor after the laser drill first strikes the second thin material;
    generating a second signal with the processor and transmitting the second signal to an alerting device in response to receiving the first signal from the thermal detector; and
    altering operation of the laser drill in response to the second signal.

9. The method of claim 8, further comprising recording an image of a thermal bloom associated with a temperature increase detected by the thermal detector.

10. The method of claim 8, further comprising ceasing operation of the laser drill in response to the second signal from the processor.

11. The method of claim 8, further comprising transmitting the second signal to an actuator in response to receiving the first signal from the thermal detector, wherein the actuator moves the laser drill in response to the second signal.

12. A method of detecting a backstrike on thin materials, comprising:
   drilling a hole in a first thin material with a laser drill;
   monitoring a second thin material proximate the first thin material with a thermal detector;
   detecting when the laser drill first strikes the second thin material by detecting a change in temperature in the second thin material with the thermal detector;
   transmitting a first signal from the thermal detector to a processor when the change in temperature is equal to or greater than a preset value;
   generating a second signal with the processor and transmitting the second signal to an alerting device in response to the first signal from the thermal detector; and
   altering operation of the laser drill in response to the second signal.

13. The method of claim 12, further comprising ceasing operation of the laser drill in response to the second signals received from the processor.

* * * * *